April 17, 1951        J. OSWALD        2,549,124
FENDER CONSTRUCTION
Filed Oct. 23, 1948
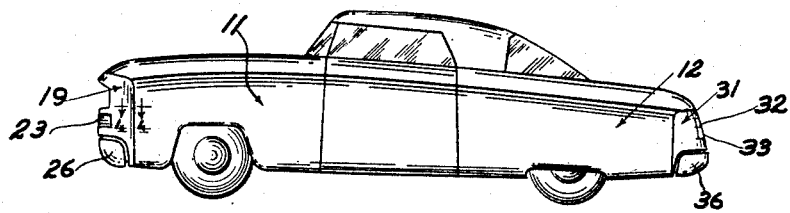
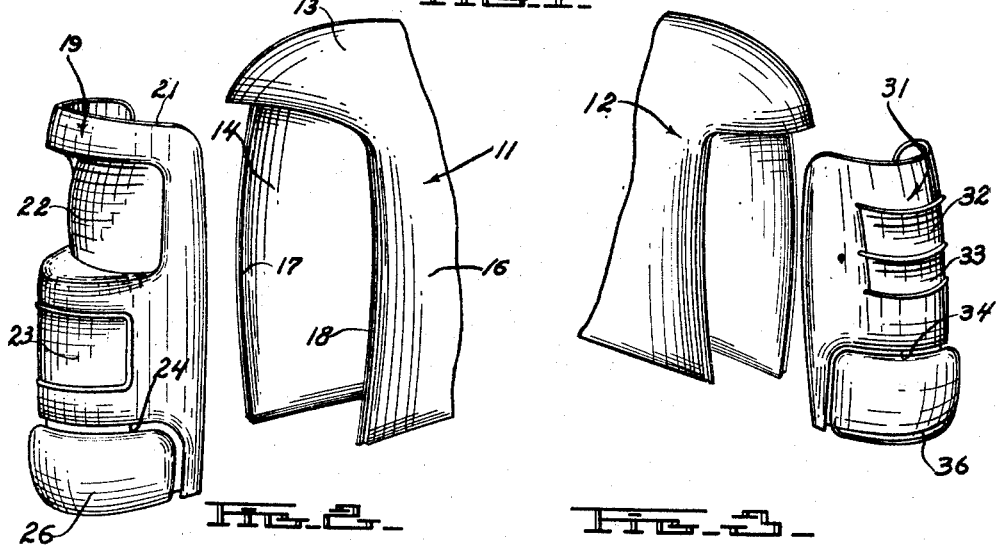
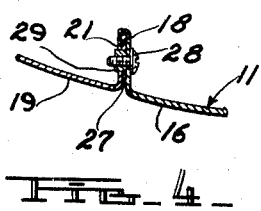 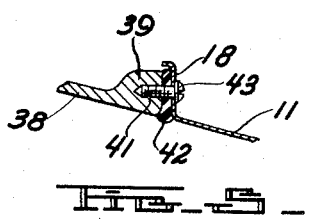
JOHN OSWALD
INVENTOR.
BY E. C. McRae
J. R. Faulkner
T. H. Oster
ATTORNEYS Patented Apr. 17, 1951

2,549,124

UNITED STATES PATENT OFFICE 2,549,124

FENDER CONSTRUCTION

John Oswald, Detroit, Mich., assignor to Ford Motor Company, Dearborn, Mich., a corporation of Delaware Application October 23, 1948, Serial No. 56,216

2 Claims. (Cl. 280—152)

This invention has reference to the fender construction of automotive vehicles.

Trends in the styling of automotive vehicles of the passenger type have made it increasingly difficult to economically fabricate fenders. Particular difficulty has been experienced at the forward end of front fenders and at the rearward end of rear fenders, and due to the extremely deep draws which would be required in these areas it is virtually impossible to make modern fenders in a single piece. As a result, several unsatisfactory expedients have been adopted. For example, fenders have been longitudinally divided and formed in two pieces. In some cases, the fenders have been divided even further, with small body panels adjacent the grille actually forming parts of the fenders proper. With these arrangements it is necessary to weld a number of joints, and then to either solder the joints to provide a smooth external surface or to cover the joints with decorative trim strips. The result has been an increase in cost due to the additional labor involved, and the freedom of the stylist has been somewhat impaired due to the fact that he must continually bear in mind the production difficulties to be encountered. Furthermore, the existence of additional visible seams in the body construction impairs the trim appearance of the vehicle.

For some time it has been customary to mount the headlights and taillights in the fenders themselves and this has required the provision of suitable apertures in the fenders for the reception of these units. Separate parking lights are also usually provided as standard equipment and are located separately from the headlights. In addition, numerous other lighting accessories are often added, such as fog lights, turn indicators, back-up lights, etc. These have been mounted in various places, usually adjacent but separate from the fenders, and have not contributed to the overall appearance of the vehicle since they do not give it a planned styling effect but form a rather hodgepodge appearance.

It is accordingly an object of the present invention to provide a fender construction eliminating the aforementioned disadvantages of the conventional arrangement. It is among the objects to provide a fender construction which may be easily and economically manufactured in one piece with a rather simple drawing operation, so that no deep and difficult draws are necessary. This not only simplifies die construction but also eliminates the additional labor necessary to weld the fender sections together and to solder the joints. The designer is also given greater latitude in styling and he is not required to use decorative trim strips to cover seams. The arrangement contemplated also provides a unitary assembly of all lighting equipment in the cap of the fender. This not only greatly enhances the appearance of the vehicle since it eliminates separate pieces of lighting equipment and instead provides a unified, blended combination of lighting units, but also reduces cost by simplifying the mounting of the various lighting units and by making it possible to preassemble the units in the fender cap.

In a preferred embodiment of the invention separate fender caps are formed housing all of the lighting equipment and the caps are designed for ready attachment to the fenders. Inasmuch as the caps form the major portions of the ends of the fenders, the latter may be readily formed by simple drawing operations. Provision is also made in the fender cap for receiving the ends of the bumpers so as to provide a pleasing appearance for the entire assembly.

Other objects and advantages of this invention will be made more apparent as this description proceeds, particularly when considered in connection with the accompanying drawings, wherein:

Figure 1 is a side elevation of an automobile embodying the present invention.

Figure 2 is an exploded perspective view of the forward portion of the front fender and the front fender cap adapted to be assembled thereto.

Figure 3 is an exploded perspective view of a portion of a rear fender and the rear fender cap adapted to be assembled thereto.

Figure 4 is an enlarged cross sectional view taken substantially on the plane indicated by the lines 4—4 of Figure 1, and illustrating the manner of connecting the fender and fender cap.

Figure 5 is a cross sectional view similar to Figure 4 but illustrating a somewhat modified construction.

Referring now more particularly to the drawing, there is shown in Figure 1 a motor vehicle having front and rear fenders 11 and 12 respectively. The front fender 11, as best seen in Figures 1 and 2, has an arched upper portion 13 and integral inner and outer walls 14 and 16 respectively. The sidewalls 14 and 16 terminate at their forward edges in transversely extending flanges 17 and 18 each turned inwardly of the fender. The upper fender portion 13 and the inner and outer walls 14 and 16 respectively cooperate to define at their forward ends an opening for the reception of the front fender cap 19.

The front fender cap 19 comprises a sheet metal stamping generally U-shaped in horizontal cross section and provided with a flange 21 completely around its rearward edge, the flange 21 being adapted to fit and be connected to the flange at the forward edge of the fender. The fender cap 19 houses the lighting equipment normally carried at the front of the vehicle. For example, the headlight 22 is mounted in the upper portion of the cap and in the present instance is shown as being recessed into the cap. A second lighting unit 23 is positioned in the forward face of the cap beneath the headlight 22 and forms a combination parking light and turn indicator. If desired it may also house a fog light. The lower portion of the front fender cap 19, beneath the lighting unit 23, is recessed as at 24, to accommodate the end portion of the front bumper 26. The bumper and the fender cap may be styled so as to properly blend together to provide a pleasing appearance.

While of course the fender cap may be mounted upon the fender by any of a number of attaching means, in the present instance the two are joined together in the manner best shown in Figure 4. It will be noted that the inturned flanges 18 and 21 of the front fender 11 and fender cap 19 respectively are separated by a gasket 27 which may be of rubber or other suitable insulating material. The inboard edge of the flange 18 is bent forwardly to assist in retaining the gasket 27 and to aid in properly aligning the fender cap with the fender during assembly. Aligned apertures are provided in the flanges 18 and 21 for the reception of threaded fastening elements 28. For ease in assembly, the fastening elements 28 are inserted from the rearward side of the flange 18 and threadedly engage conventional nuts 29 carried by the flange 21. These nuts may be of the clinch-on type or may be mounted upon the flange 21 in any suitable manner.

From the foregoing it will be seen that a construction is provided which is advantageous both from the styling and production aspects. The completed assembly provides a striking appearance and readily lends itself to many styling variations. In addition, the fender 11 is a simple sheet metal stamping which can be readily drawn in a single piece without difficult or numerous drawing operations. The fender need not be divided into separate pieces and there are no joints requiring welding or soldering or that need to be concealed by decorative trim strips. Likewise, the fender cap 19 is a relatively simple stamping and can be pre-assembled with the lighting units 22 and 23 so that during final assembly of the vehicle it need only be positioned adjacent the opening in the forward portion of the fender 11 and secured thereto by the fastening elements 28.

Inasmuch as the construction of the rear fender 12 and the rear fender cap 31 is generally the same as that of the front fender and front fender cap, it will be unnecessary to describe them in detail. It will be noted that the rear fender cap contains various lighting units, in this instance a combined stoplight, reflector and turn indicator 32 and a back-up light 33. The lower portion of the rear fender cap 31 is recessed at 34 to receive the end of the rear bumper 36.

The rear fender 12 and the rear fender cap 31 are provided with cooperating flanges similar to those on the front fender and front fender cap and are fastened together by suitable fastening elements of the type shown in Figure 4. It will be apparent that the advantages previously mentioned in connection with the front fender are also inherently present in the rear fender construction.

Figure 5 illustrates a somewhat modified construction for joining together the fenders and fender caps. The front fender 11 and flange 18 are the same as in Figure 4, but it will be seen that the fender cap, now designated by the reference character 38, is a die casting rather than a sheet metal stamping. The rearward edge of the fender cap 38 is enlarged as at 39 and is provided with a series of tapped holes 41. A gasket 42 is placed between the enlarged end 39 of the fender cap and the flange 18 of the fender, and fastening elements 43 are inserted through aligned holes in the flange 18 and the gasket 42 and threaded into the tapped holes 41 in the fender cap.

It is also within the contemplation of this invention to mount equipment other than lighting units in the fender cap. For example, horns might conveniently be carried by the front fender cap.

It will be understood that the invention is not to be limited to the exact construction shown and described, but that various changes and modifications may be made without departing from the spirit and scope of the invention, as defined in the appended claims.

What is claimed is:

1. In a vehicle body construction, in combination, an integral one-piece sheet metal fender having a transversely arched top wall and substantially vertical side walls depending from the inner and outer sides of the top wall, said side walls being integrally formed with said top wall and the inner side wall forming a wheel housing panel and the outer side wall forming the exterior surface of the fender and vehicle body, said inner and outer walls terminating beyond the end of the vehicle wheel in substantially vertical edges which are transversely aligned with each other to form an inverted U shaped fender open at the bottom and one end, the vertical edges at the end of the side walls extending downwardly below the centerline of the vehicle wheel and having inturned flanges, and a sheet metal fender cap generally U shaped in horizontal cross section and having its free edges extending in vertical and transverse alignment with each other and provided with inturned flanges arranged in juxtaposition to the flanges on the vertical edges of the fender side walls, said fender cap having vertically spaced openings formed in its outer face, lighting units wholly supported by said fender cap in alignment with said openings, and connecting means detachably connecting said fender cap to said fender to permit removal and assembly of said fender cap and lighting units as a unit assembly.

2. In a vehicle body construction, in combination, an integral one-piece sheet metal fender having a transversely arched top wall and substantially vertical side walls depending from the inner and outer sides of the top wall, said side walls being integrally formed with said top wall and the inner side wall forming a wheel housing panel and the outer side wall forming the exterior surface of the fender and vehicle body, said inner and outer walls terminating beyond the end of the vehicle wheel in substantially vertical edges which are transversely aligned with each other to form an inverted U shaped fender open at the bottom and one end, the transversely arched top wall of said fender extending longitudinally outwardly beyond the vertical edges at the end of the side walls to form a protruding hood-like cover for the opening at the end of the fender, the vertical edges at the end of the side walls extending downwardly below the centerline of the vehicle wheel and having inturned flanges, and a sheet metal fender cap generally U shaped in horizontal cross-section and having its free edges extending generally vertically in transverse alignment with each other and provided with inturned flanges arranged in juxtaposition to the flanges on the vertical edges of the fender side walls, said U shaped fender cap being open at its upper end and having an inturned flange defining the boundary of its upper end with this inturned flange being in alignment with the outer edges of the hood-like portion protruding from the top wall of the fender so that the fender cap forms a smooth continuation of the top wall and side walls of the fender, vertically spaced openings in the forward face of the U shaped fender cap, lighting units wholly supported by said fender cap in alignment with said openings, and connecting means detachably connecting the inturned flanges of said fender cap to the corresponding inturned flanges of said fenders to permit removal and assembly of said fender cap and lighting units as an assembled unit.

JOHN OSWALD.

REFERENCES CITED

The following references are of record in the file of this patent:

UNITED STATES PATENTS

| Number | Name | Date |
| --- | --- | --- |
| 1,907,044 | Crowe | May 2, 1933 |
| 2,060,527 | Peterson | Nov. 10, 1936 |
| 2,257,556 | Webb | Sept. 30, 1941 |
| 2,313,587 | Saurer | Mar. 9, 1943 |

FOREIGN PATENTS

| Number | Country | Date |
| --- | --- | --- |
| 877,095 | France | Aug. 24, 1942 |